Nov. 3, 1964  K. STÖCKEL  3,154,914
ROCKET ENGINE CONSTRUCTION
Filed Dec. 8, 1960  4 Sheets-Sheet 1
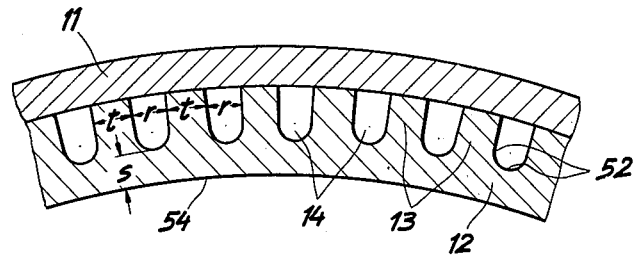
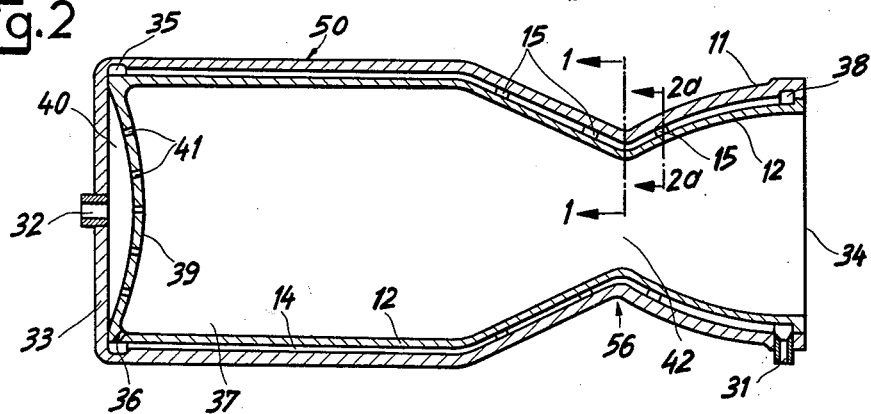
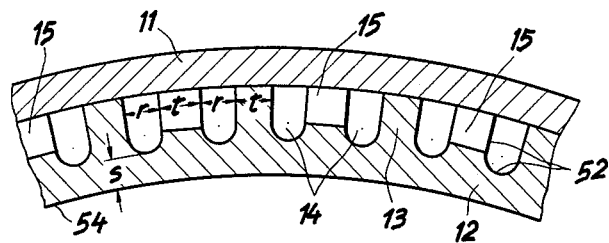
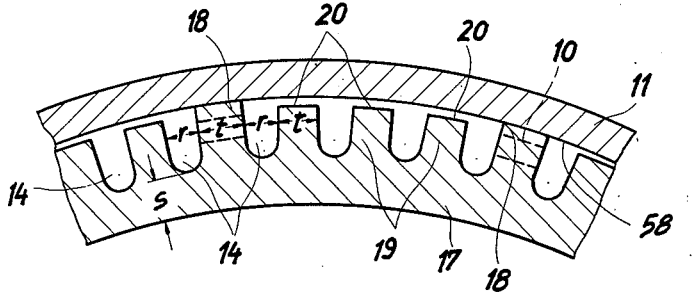
INVENTOR
Karl Stöckel
By McGlew and Toren
ATTORNEYS Nov. 3, 1964  K. STÖCKEL  3,154,914
ROCKET ENGINE CONSTRUCTION
Filed Dec. 8, 1960  4 Sheets-Sheet 2

INVENTOR
Karl Stöckel

By  McGlew and Toren
ATTORNEYS

Nov. 3, 1964   K. STÖCKEL   3,154,914
ROCKET ENGINE CONSTRUCTION
Filed Dec. 8, 1960   4 Sheets-Sheet 3

INVENTOR
Karl Stöckel

By  McGlew and Toren

ATTORNEYS

Nov. 3, 1964 K. STÖCKEL 3,154,914
ROCKET ENGINE CONSTRUCTION
Filed Dec. 8, 1960 4 Sheets-Sheet 4
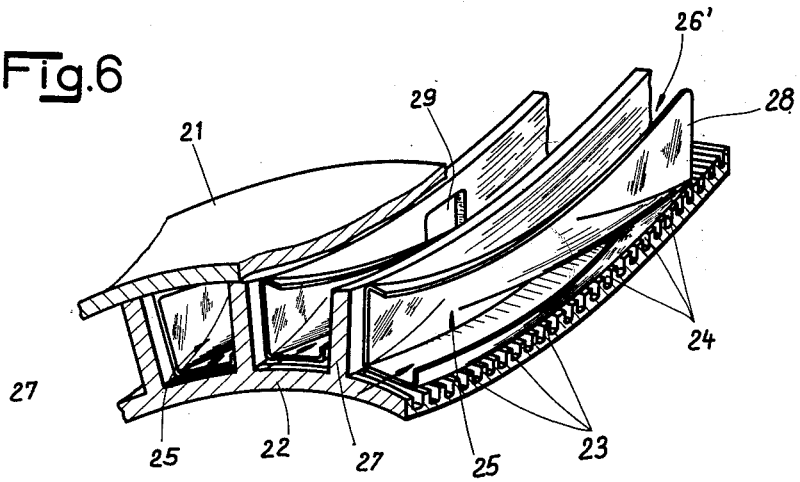
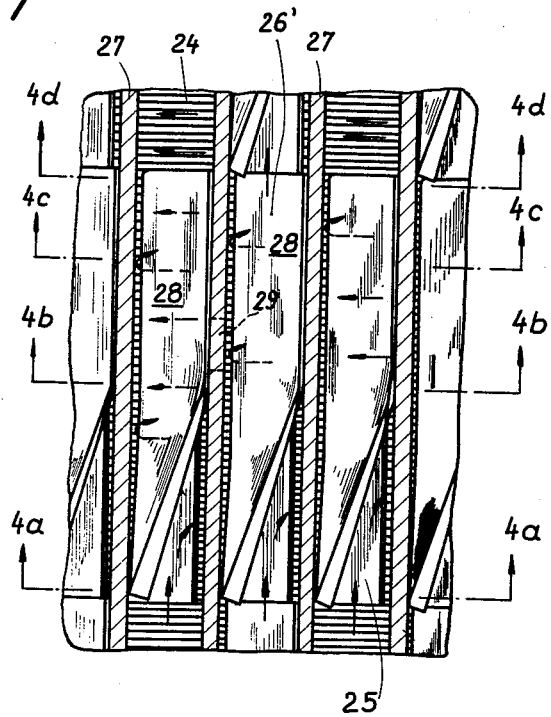
INVENTOR
*Karl Stöckel*
By McGlew and Toren
ATTORNEYS ID# 3,154,914
ROCKET ENGINE CONSTRUCTION
Karl Stöckel, Ottobrunn, Munich, Germany, assignor to Bolkow-Entwicklungen Kommanditgesellschaft, Ottobrunn, near Munich, Germany
Filed Dec. 8, 1960, Ser. No. 74,706
Claims priority, application Germany Dec. 12, 1959
14 Claims. (Cl. 60—35.6)

The present invention relates in general to a rocket engine construction and in particular to a new and useful liquid fuel rocket combustion chamber construction having a plurality of small-sized passages for cooling liquid formed around the periphery of the combustion chamber and extending intermediate the ends thereof.

The present invention is concerned with the cooling of the combustion chamber by means of fluids which are circulated along the walls thereof, and has particular application in connection with a rocket employing liquid fuel and liquid oxygen for combustion purposes. In some instances one of these fuel components is circulated over the walls of the combustion chamber for the purposes of cooling the chamber prior to the employment of the fuel component for combustion purposes. In prior art constructions, however, it was found that since the cooling medium employed was a liquid which boiled easily, for example, liquid oxygen, difficulty soon was experienced in adequately cooling the combustion chamber. This is due to the occurrence of a so-called Leidenfrost effect in which both the liquid and the gas components of the oxygen are present at the same time. During the existence of such a condition a cushion or pad of vapor is often formed on one of the walls in the cooling conduits and this vapor retards the flow of the cooling liquid therethrough. Besides adversely affecting the flow of liquid through the cooling conduits the heat exchange between the cooling liquid and the combustion chamber wall is also retarded.

In accordance with the present invention the combustion chamber is constructed with a jacket having two walls which are either directly or indirectly connected together and wherein the spaces between the walls are separated by web or rib portions which define cooling channels for circulating cooling liquid therethrough.

In a preferred construction the inner wall is provided with a plurality of radially outwardly extending ribs or webs which are spaced apart to define cooling channels therebetween. The inner wall is advantageously pretensioned into tight fitting engagement with the interior face of the outer wall to form cooling conduits between the webs. In accordance with the invention it has been found that if the cooling conduits or channels are maintained to a width not in excess of 2 mm. that it is possible to obtain fluid flow in the region of the bordering walls of each channel so that the velocity of the fluid flow is maintained substantially constant across the entire cross-section. In such a manner stagnation in the vicinity of a wall or the formation of vapor locks is prevented.

If the average velocity of such an embodiment is maintained over 10 meters per second and even with boiling liquid, such as liquid oxygen, the undesired vapor lock or vapor bubble formation in the vicinity of the walls is prevented.

It is preferable in accordance with the present invention to maintain the cooling channel width at a maximum of 2 mm., which, of course, is dependent upon the nature of the cooling liquid but which applies to both large sized and small sized rocket engines. In those instances in which it is desired to circulate a great deal of fluid through the channels or conduits then the height of the webs are enlarged to accommodate to increased flow. When a smaller throughput or flow is to be obtained then the conduit or channel width is decreased.

A feature of the inventive construction is that the channels are provided with a rectangular cross-section and that one of the shorter dimensioned sides of the rectangle is directed toward the combustion space. In such a manner it is possible to employ high ribs or webs between the cooling channels which insure a good transfer to the cooling medium. The corners of the cooling channels which are directed toward the combustion space are advantageously rounded off.

Experiments and tests have shown that no vapor formation will occur even with liquids which boil easily, such as liquid oxygen, provided the cooling channels are maintained correspondingly narrow. The heat transfer to the cooling medium over the same temperature range is about inversely proportional to the width of the channel. This effect is increased by constructing the cooling channels and cross-sections as radially extending rectangles with the inwardly directed corners rounded off.

Due to the small total cross-section of all the cooling channels which are arranged around the combustion chamber in accordance with the invention, a high flow velocity results in each cooling channel so that the cooling action is sufficient even under very high temperature dissipating conditions. By having a different or varying flow velocity along the length of the cooling conduit and also by means of causing turbulences in each conduit sufficient cooling is assured even at the locations of unusually high temperature conditions.

In accordance with an embodiment of the invention cooling channels are provided to extend in a longitudinal direction around the combustion chamber but in some areas they are provided with tangentially extending compensation lines. These compensation lines are provided particularly in the area adjacent the narrowest zone of the jet nozzle. Some of the cooling channels are arranged to open up or merge into these compensation lines and they are not continued in the region of the nozzle due to the small circumference of the contour of such location.

In accordance with another embodiment of the invention some adjacent cooling channels at their outer ends are connected with each other over their entire lengths. In some instances the webs between connected channels are interrupted or broken through at several distinct places. In such a manner through flow is obtained in which a differential in the inflow is automatically compensated. An additional advantage lies in the very simple manner of manufacturing the combustion chamber of the present invention. In those instances in which the inner wall is pretensioned into contact with the interior face of the outer wall it is only necessary to weld the web to the outer wall by welding at spaced locations and this is a very simple and easy matter.

In accordance with another embodiment of the invention which is particularly advantageous for large sized rocket engines, the inner and outer walls are arranged at a distance from each other and connections are made between the walls by radially extending webs or crosspieces which are formed from and extend from the inner wall and some of which are secured to the outer wall. The cooling conduits which are thus formed are advantageously subdivided by the use of adjustable guiding plates so that the flow between plates may be divided up for the purpose of insuring high velocity flow throughout the entire conduit.

Thus accordingly it is an object of the present invention to provide an improved rocket engine combustion chamber.

A further object of the invention is to provide a rocket engine combustion chamber having a plurality of cooling conduits defined around the periphery thereof and extending longitudinally therealong said cooling channels being substantially rectangular in cross-section and having a width of approximately 2 mm.

A further object of the invention is to provide an improved combustion chamber construction including an outer wall and an inner wall having a plurality of outwardly extending radially spaced web members defining cooling channels therebetween, said inner wall being pretensioned and biased into contact with the interior face of the outer wall.

A further object of the invention is to provide an improved combustion chamber for a rocket engine having liquid fuel including an inner wall having a nozzle formation intermediate its length, an outer wall surrounding said inner wall and closely spaced therefrom and a plurality of longitudinally extending web members spaced around the complete periphery of said inner wall, at least some of which are in contact with the outer wall to define therebetween cooling fluid conduits said webs being radially spaced by an amount not greater than 2 mm.

A further object of the invention is to provide a combustion chamber formed by inner and outer spaced walls, outwardly extending webs formed on the inner of said walls extending along the complete length of said combustion chamber to define longitudinal cooling conduits therebetween, means for directing a coolant fuel component into said longitudinal cooling conduits and a separate means at the inner end of said combustion chamber for directing a liquid fuel component into the space between said inner and outer walls and then into said combustion chamber.

A further object of the invention is to provide a combustion chamber which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary sectional view taken on the line 1—1 of FIG. 2;

FIG. 2 is a longitudinal section through a combustion chamber constructed in accordance with the invention;

FIG. 2a is a section taken on the line 2a—2a of FIG. 2;

FIG. 3 is a fragmentary section similar to FIG. 1 but indicating another embodiment of the invention;

Figure 4A:
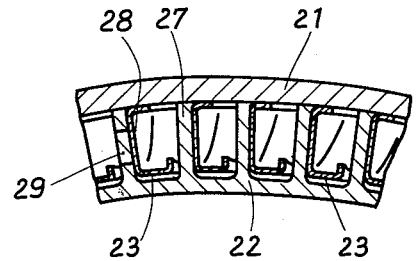
FIG. 4 is a fragmentary section similar to FIG. 1 but indicating still another embodiment of the invention.
Figure 4B:
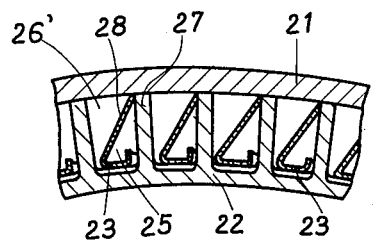
Figure 4C:
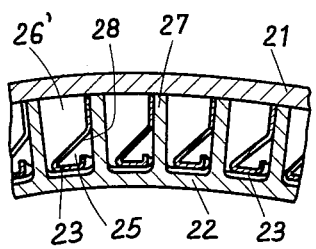
Figure 4D:
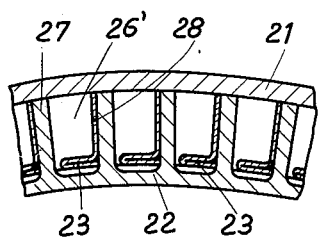
Figure 4:
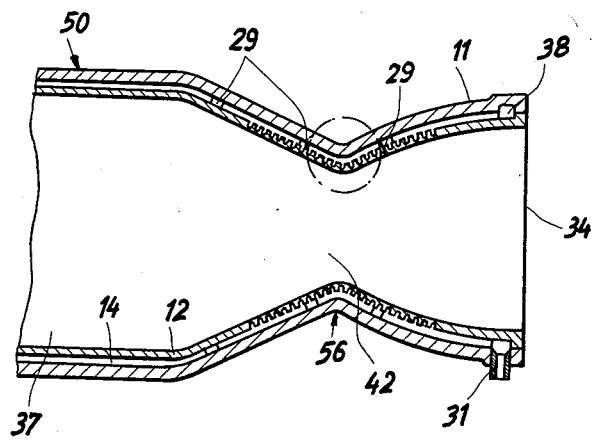
Figure 5:
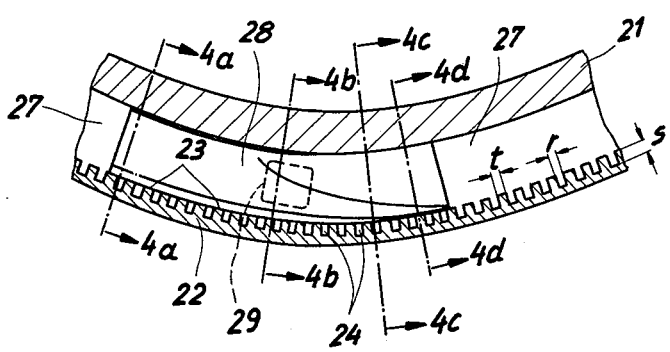

FIGS. 4a, 4b, 4c and 4d are fragmentary sections taken on the lines 4a—4a, 4b—4b, 4c—4c and 4d—4d, respectively, of FIG. 5;

FIG. 5 is an enlarged section taken at the location circled by dot and dash lines in FIG. 4;

FIG. 6 is a perspective view, partly broken away, of the circled area of FIG. 4; and FIG. 7 is a top plan view of the area indicated in FIG. 6 with the cover removed.

Referring to the drawings in particular the invention embodied therein includes a rocket engine combustion chamber generally designated 50 having an inner wall 12 and an outer wall 11 spaced closely therefrom. A plurality of cooling channels or conduits 14 are defined between walls 12 and 11 by radially extending ribs or webs 13. The webs 13 are advantageously formed by milling or cutting the channels 14 on the exterior surface of the inner wall 12.

In accordance with the invention the channels 14 are advantageously rectangular in cross-section and have inner rounded corners 52. The width $r$ of the channels is advantageously made smaller than the wall thickness $t$ of the webs 13.

As clearly indicated in FIG. 1, the following dimensional relationships exist:

(1) The height of the cooling channel 14 is greater than the width $r$ ($r < hc$).

(2) The cooling channel width $r$ is less than 2 mm. ($r < 2$ mm.).

(3) The wall thickness S is less than 2 mm. ($S < 2$ mm.).

(4) The width $t$ of the ribs 13 is at least equal to half the thickness of the wall S ($t \geq \frac{1}{2}S$) ($t_{max} = 3S$).

In accordance with the invention the channels 14 are disposed around the complete periphery of the space between the generally cylindrical walls 11 and 12 which define an interior combustion chamber 37. The channels 14 are connected together at one end by an annular channel 35. The cooling conduits extend along the complete length of the combustion chamber and are provided with an annular channel 38 having an inlet 31 through which coolant is circulated.

In accordance with the invention the coolant is advantageously one of the components of the fuels burned in the rocket and advantageously is liquid oxygen. The exterior wall 11 is provided with a bottom 33 in which there is located a liquid fuel inlet 32 for another fuel component which may advantageously be a fuel oil. This fuel is directed into a space 40 defined by the bottom 33 and a concave portion 39 of the interior wall 12. The wall 39 advantageously includes a plurality of openings 41 for the purpose of the passage of the fuel oil from the chamber 40 into the combustion chamber 37 for ignition therein. Annular chamber 35 also includes openings 36 to permit the other fuel component to flow into the combustion chamber 37 after it has first cooled walls 11 and 12.

The combustion chamber 50 is advantageously provided with a reduced neck or nozzle portion 56 and terminates in an open end 34 spaced downstream therefrom.

In accordance with the invention it has been found that the cooling channels 14 are advantageously made of a width not more than 2 mm. in order to insure high velocity flow of the liquid throughout the cooling channels and the prevention of vapor lock therein. In the region of the neck 56 the webs 13 between channels are cut away to define openings 15 through which a uniform flow of cooling fluid as possible is assured, particularly at this location in the combustion chamber which is subject to great thermal stresses and high temperatures. Since the neck portion 56 effectively reduces the annular area through which the cooling channels may extend, it is necessary to provide the compensation channels 15 to facilitate the manufacture of this device and also to provide for uniform flow in such areas. It is also possible to make the width of the channels 14 of uniform dimension throughout the entire length including the area of the neck 56.

In FIG. 3 there is indicated outer wall 11 and inner wall 17 which is formed with radially extending webs or ribs 18, some of which are made to a longer dimension than others and are in direct contact with the interior face 58 of the outer wall 11. The webs 18, which are of increased radial dimension are advantageously made the fourth web of each series spaced circumferentially around the combustion chamber and they are welded to wall 11.

Intermediate ribs or webs 19 are spaced slightly from the interior face of the outer wall 11 and therefore define cross channels 20 therebetween which communicate with the cooling channels 14 in a series. Since the ribs 19 do not contact the outer wall they merely serve the purpose of cooling ribs in this embodiment. The cooling channels 14 are, however, of a width which is not in excess of 2 mm. in order to achieve the most desirable cooling fluid flow through the channels. The cross connection of the channels 14 by means of the slots or cross channels 20 effects uniform through flow over the entire channel cross-sections. Openings 10 in webs 18 are provided in the vicinity of the narrowest cross-section of the nozzle adjacent the neck 56 and these provide a means for effecting a complete compensation between the fluid flow in the individual channels. For example, if there is any uneven flow the slots 20 are so narrow that the longitudinal flow in these slots is relatively small compared to the flow in the channels 14 themselves.

In the embodiment indicated in FIGS. 4 and 5 which is particularly suitable for large sized rocket engines with high capacity and output an inner wall 22 is provided with radially spaced outstanding ribs or webs 27 which are connected into an outer wall 21 by means of a dovetail fit. The webs 27 form feeding channels 26 in longitudinal direction, the inner faces of which are provided with cross cooling channels 24 defined between the shortened webs on partition elements 23. These cross cooling channels are of a length which corresponds or conforms to the width of the feeding channels 26 and liquid is directed therethrough in a tangential direction. Due to the invention the width of these cross cooling channels 24 should be not larger than the radial extension of the cross cooling channels and less than 2 mm.

In this construction fluid flow to the auxiliary cross channels 24 is adjusted in magnitude by means of guiding plates 28 which are arranged in the channels 26 dividing the same into inlet channels 25 and discharge channels 26'. The guide plates 28 are shaped in such a manner that the channel 25 becomes constantly narrower along its length while the channel 26 becomes correspondingly wider. This is indicated in FIG. 4 by the different cross-section taken at $a$ through $d$ of the guide plate 28 corresponding to the sections in the various planes $a$ through $d$ in FIG. 5.

With the construction as indicated in FIGS. 4 and 5 the extent of the constriction or widening of the channels 26 and the flow through the cooling channels 24 may be exactly determined. Openings 29 between the inlet channels 25 and their respective adjacent discharge channels 26 make sure that there is a compensation and thus that there is uniform flow.

It is irrelevant for this invention concerning which of the fuel components is passed through the walls of the combustion chamber for working purposes. Either liquid oxygen or a fuel oil may be used for this purpose. Similarly it is irrelevant which one of the fuel components is supplied through the bottom inlet 32 to combustion space 37. It should also be realized that the invention is applicable to engines which are operated by three or more fuel components, for example, where in addition to liquid oxygen or an oxygen carrier and a fuel, such as fuel oil, there is provided a third component which may preferably serve for cooling purposes and is thereafter fed to the combustion space 37. In this latter case it would be advantageous if this additional fuel component which, as a rule would be water, is the one which is conducted through the wall of the combustion chamber.

While specific embodiments of the invention have been shown and described in detail to illustrate the application of the invention principles, it will be understood that the invention may be embodied otherwise without departing from such principles.

What is claimed is:

1. A rocket combustion chamber for liquid fuels comprising a jacket of two superimposed walls, the inner wall being provided with angularly spaced projecting ribs defining cooling channels therebetween, said ribs extending longitudinally along the complete length of said inner wall, said cooling channels being of substantially rectangular configuration, said inner wall having a thickness smaller than 2 mm., the width of said channels measured between ribs being less than 2 mm. the height of said channels measured from the inner wall to the top of the adjacent rib being larger than the width of said cooling channels and the width of said cooling channels being substantially equal to the thickness of said inner wall measured from the interior of said inner wall to said cooling channels.

2. A rocket combustion chamber according to claim 1, wherein some of said ribs extend outwardly from said inner wall into touching contact with said outer wall and at least some of said ribs terminate inwardly of said outer wall.

3. A rocket combustion chamber according to claim 1, including a plurality of shortened partition elements extending outwardly from said inner wall and between said ribs and defining cross flow paths at the lower portions of said channels, and longitudinally extending plate elements positioned in said channels providing means for directing flow longitudinally in said cooling channel and downwardly for cross flow through said cross channel.

4. A rocket combustion chamber according to claim 1, wherein the inner end of said channels is rounded.

5. A rocket combustion chamber according to claim 1, wherein at least some of said ribs are connected to the exterior wall.

6. A rocket combustion chamber according to claim 1, wherein said dividing ribs are of a greater thickness than the width of said channels.

7. A rocket combustion chamber according to claim 1, wherein said inner wall is pretensioned into contact with said outer wall.

8. A rocket engine according to claim 1, wherein at least the fifth one of said ribs a series progressing around the circumference of said inner wall is connected to said outer wall.

9. A rocket engine according to claim 1, including means at one end of said combustion chamber for introducing a fuel component and additional means connected to said channels for directing a fuel component therethrough and into said combustion chamber.

10. A rocket engine according to claim 1, including an annular member at each end of said ribs interconnecting each of the channels defined around said combustion chamber, means for introducing a fuel component to one end of each said channels and means for directing fuel out the opposite end of each of said channels and into said combustion chamber.

11. A rocket engine according to claim 1, wherein each of said ribs is engaged with said outer wall to demarcate each of the fluid channels therebetween.

12. A rocket engine according to claim 1, including an opening defined in at least one of said ribs to permit cross flow between adjacent conduits.

13. A combustion chamber for a rocket engine comprising an inner wall having a converging portion defining a nozzle adjacent one end and being closed at the opposite end, an outer wall closely spaced from said inner wall, said inner wall having a plurality of angularly spaced outwardly extending ribs formed thereon and spaced by an amount not exceeding approximately 2 mm. to define cooling fluid channels therebetween, said outer wall being in contact with the outer ends of said ribs, said ribs extending along the length of said inner wall, the height of said cooling channels measured from said inner wall to said outer wall being greater than the width of said cooling channels, the thickness of said inner wall being less than 2 mm. and the thickness of said ribs being at least equal to half the thickness of said inner wall, and the width of said cooling channels being substantially equal to the thickness of said inner wall measured from the interior of said inner wall to said cooling channels, an annular connecting member at each end of said inner wall connecting each of said other channels between said ribs, means to introduce a liquid fuel component into one of said annular members for flow through said channels to the other of said annular members, and means to direct a second liquid fuel component into the closed inner end of said combustion chamber.

14. A combustion chamber for a rocket engine according to claim 13, including a plurality of openings defined in said ribs adjacent the nozzle of said combustion chamber to permit uniform cross flow of cooling fluid through said channels.

References Cited in the file of this patent

UNITED STATES PATENTS

| | | |
|---|---|---|
| 2,585,626 | Chilton | Feb. 12, 1952 |
| 2,919,549 | Haworth et al. | Jan. 5, 1960 |
| 2,935,841 | Myers et al. | May 10, 1960 |
| 2,943,442 | Baehr | July 5, 1960 |
| 2,975,590 | Vonder Esch | Mar. 21, 1961 |

FOREIGN PATENTS

| | | |
|---|---|---|
| 1,019,865 | Germany | Nov. 21, 1957 |